United States Patent [19]

Emmons et al.

[11] 4,333,963
[45] Jun. 8, 1982

[54] RADIATION CURABLE COMPOSITIONS CONTAINING β-CYANOETHOXYALKYL ACRYLATES

[75] Inventors: William D. Emmons, Huntingdon Valley; Donald A. Winey, Warminster; Nicholas A. Rounds, New Britain, all of Pa.

[73] Assignee: Rohm and Haas Company, Philadelphia, Pa.

[21] Appl. No.: 222,784

[22] Filed: Dec. 30, 1980

[51] Int. Cl.$^3$ .............................................. B05D 3/00
[52] U.S. Cl. ................................... 427/44; 156/331.7; 204/159.15; 204/159.16; 204/159.19; 204/159.22; 204/159.23; 204/159.24; 427/54.1; 526/297; 526/298
[58] Field of Search ................. 526/298, 297; 427/44, 427/54.1; 204/159.14, 159.15, 159.16, 159.19, 159.22, 159.23, 159.24; 156/331, 331.7

[56] References Cited

U.S. PATENT DOCUMENTS

| | | | |
|---|---|---|---|
| 2,720,512 | 10/1975 | Butler | 260/88.7 |
| 3,445,403 | 5/1969 | Tucker et al. | 526/298 X |
| 3,551,235 | 12/1970 | Bassemir et al. | 156/99 |
| 3,551,246 | 12/1970 | Bassemir et al. | 156/272 |
| 3,551,311 | 12/1970 | Nass et al. | 204/159.18 |
| 3,552,986 | 1/1971 | Bassemir et al. | 117/12 |
| 3,558,387 | 1/1971 | Bassemir et al. | 156/99 |
| 3,650,669 | 3/1972 | Osborn et al. | 8/115.5 |
| 3,661,614 | 5/1972 | Bassemir et al. | 117/38 |
| 3,772,062 | 11/1973 | Shur et al. | 117/93.31 |
| 3,783,006 | 1/1974 | Hahn et al. | 117/93.31 |
| 4,097,677 | 6/1978 | Emmons et al. | 560/220 |
| 4,128,536 | 12/1978 | Brodsky et al. | 427/54.1 |
| 4,148,987 | 4/1979 | Winey | 526/316 |
| 4,154,914 | 5/1979 | Kuraya | 526/298 X |
| 4,265,976 | 5/1981 | Nowak | 427/54.1 X |

FOREIGN PATENT DOCUMENTS 50-09668 1/1975 Japan .
50-52190 5/1975 Japan .

OTHER PUBLICATIONS

Chem. Abs. 83: 28832k (1975).
Chem. Abs. 83: 115766p (1975).

*Primary Examiner*—Norman Morgenstern
*Assistant Examiner*—Thurman K. Page
*Attorney, Agent, or Firm*—Lester E. Johnson

[57] ABSTRACT

There are disclosed radiation curable compositions containing (a) about 5-95% by weight of at least one β-cyanoethoxyalkyl acrylate, (b) about 1-90% by weight of a photopolymerizable acrylated polymer or oil, and (c) from 0 to about 5% by weight of a photoinitiator. The compositions are useful in providing 100% solids coatings and adhesive compositions which are capable upon exposure to radiation, and which are useful in a variety of applications such as for coating textiles and fabrics, for producing pressure sensitive adhesives, and for producing laminating adhesives.

8 Claims, No Drawings

RADIATION CURABLE COMPOSITIONS CONTAINING β-CYANOETHOXYALKYL ACRYLATES

BACKGROUND OF THE INVENTION

This invention relates to radiation curable 100% solids coatings and adhesive compositions containing cyanoethoxyalkyl acrylates as a non-volatile, non-toxic and highly polar reactive monomer (reactive diluent).

It is well known in the art to deposit polymerizable liquid coatings on substrates and then to dry and cure such coatings by passing them through ovens to crosslink the coatings. It is also known in the art to use coatings which are curable by exposure to actinic radiation such as ultraviolet rays or that from plasma are radiation sources, as well as by exposure to high energy ionizing radiation such as electron beam radiation. These systems have disadvantages in that either ovens are required or that, in radiation curable coatings, oxygen inhibition of the polymerization of the coating may occur, or it may be necessary to employ solvents to decrease the viscosity of the coating for application purposes.

Due to energy and raw material shortages, increasingly strict air pollution standards and safety regulations, the search is continuing for one hundred percent polymerizable systems, i.e., compositions which have no highly volatile components but which contain reactive viscosity reducing diluents which become either the sole cured film or part of the cured film. Such types of compositions are known, for example, multifunctional acrylates, methacrylates and itaconates of pentaerythritol, dipentaerythritol and polypentaerythritols and others disclosed in U. S. Pat. Nos. 3,551,235; 3,551,246; 3,551,311; 3,552,986; 3,558,387 and 3,661,614.

Two U.S. patents which disclose radiation cure of monofunctional acrylates are U.S. Pat. No. 3,783,006, which describes a wide number of acrylate monomers for use as diluents in polymer syrups which are cured on metal containers via electron beam radiation and U.S. Pat. No. 3,772,062 which also describes the use of various diluents in the curable coatings.

U.S. Pat. No. 4,097,677 discloses dicyclopentenyloxyalkyl (meth)acrylates and compositions thereof that can be cured by exposure to radiation.

U.S. Pat. No. 4,148,987 discloses monoethylenically unsaturated derivatives of vinylbenzyl-substituted benzophenones or acetophenones, and homopolymers and copolymers thereof that can be cured by exposure to radiation.

U.S. Pat. No. 3,650,669 discloses a method for the polymerization of a variety of monomers and for the crosslinking of polymers by exposing the monomers or the polymers to radiation. Column 6, lines 34-50 disclose the curing or crosslinking of 100% solids coating compositions containing a polymer with a reactive monomer, particularly polyesters containing the norbornenyl group with certain high boiling acrylyl esters, among which esters there is mentioned at column 11, line 56 "cyanoalkyl" esters of (meth)acrylic acid wherein the alkyl group contains up to 15 carbon atoms.

Monomers which are suitable for cure by exposure to radiation (i.e., ultraviolet light or electron beam radiation) require a wide range of properties, such as low-volatility, rapid polymerization rate, low toxicity, and low odor. Additionally, radiation curable compositions frequently contain dissolved polymers or oligomers so that the ability of the monomer to solubilize polymers with substantial reduction in viscosity becomes important. Since the monomer portion of all these compositions contacts the substrates its properties influence adhesion, flow, wetting, and so on. In textile applications it is necessary that the monomer be polar enough to yield a polymer with substantial resistance to swelling in drycleaning solvents.

The dicyclopentenyloxyalkyl (meth)acrylates yield polymers characterized by high glass transition temperatures and are well suited for paints and similar coatings on rigid substrates.

Other low volatility acrylate monomers, such as the polyol polyacrylates, are available; however, these cure to highly crosslinked and extremely hard, brittle films. Higher alkyl acrylates such as lauryl acrylate have the desired lower volatility and viscosity but their use alone as a diluent tends to promote excessive softening. Use of such higher alkyl acrylates with the dicyclopentenyloxyalkyl (meth)acrylates provides a satisfactory degree of latitude of hardness and flexibility and viscosity control not heretofore obtainable.

There is still a need for radiation curable monomers which give low glass transition temperature (Tg), flexible, and polar polymers. Butyl acrylate and 2-ethylhexyl acrylate are too volatile for general use. The higher alkyl acrylates give slower cures, are relatively non-polar, and are poor solvents for the oligomers and polymers used. The hydroxyl functional acrylates, e.g. hydroxyethyl acrylate, although having good solvency and resistance properties, are toxic and cause serious skin irritation. Similarly, ethoxyethyl acrylate is a skin irritant.

DESCRIPTION OF THE INVENTION

It is an object of the invention to provide a 100% active radiation curable composition containing a reactive diluent (or, reactive monomer) which will provide a flexible, polar polymer characterized by low Tg properties and a desirable balance of other properties.

Another object is to provide a method of coating a flexible substrate using the 100% active radiation curable composition containing the reactive monomer or diluent.

Still another object is to provide a substrate having a radiation cured composition applied to at least one surface thereof.

These and other objects as will become apparent are achieved by the present invention which comprises a radiation curable composition comprising (a) about 5-95% by weight, based on total composition, of at least one cyanoethoxyalkyl acrylate having the formula

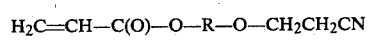

wherein R is a ($C_2$-$C_5$) alkylene group or a ($C_2$-$C_5$) oxaalkylene group having discrete alkylene segments containing at least two carbon atoms joined by the oxygen atom;

(b) about 1-90% by weight, based on total composition, of a radiation curable acrylated polymer or oil; and (c) from 0 up to about 5% by weight, based on total composition, of a photoinitiator.

In another aspect the invention comprises a method of coating a substrate which comprises applying to the substrate a composition according to the invention and curing or drying the coated substrate by exposing the coated substrate to radiation.

In still another aspect the invention comprises an article of manufacture comprising a substrate having applied thereto a radiation cured coating comprising the composition according to the invention.

Certain members of the class of reactive monomers useful in the invention, β-cyanoethoxyalkyl (meth)acrylates, and their use to form polymers, are known. However, use of these monomers as reactive monomers in radiation curable compositions is not known.

Japanese Patent Kokai No. 75 09,688, Jan. 31, 1975, reported in *Chem. Abs.* 83: 28832K (1975) and Derwent Abs. 29607 W/18 A14, describes the preparation of terpolymers containing, for example, acrylonitrile, styrene, and 2-(2-cyanoethoxy)ethyl methacrylate, the terpolymers being useful in the hot press production of sheets.

Japanese Patent Kokai No. 75 52,190, May 9, 1975, reported in *Chem. Abs.* 83:115776p (1975), describes impact-resistant acrylonitrile resins prepared by grafting a nitrile monomer and a nitrile-containing unsaturated carboxylic ester, for example, 2-(2-cyanoethoxy)ethyl methacrylate, and optionally a vinyl aromatic compound, onto a diene-nitrile rubber.

U.S. Pat. No. 2,720,512, Oct. 11, 1975, discloses 3-(2-cyanoethoxy)propyl or 4-(2-cyanoethoxy)butyl acrylates useful, with other compounds having the vinyl ($H_2C=CH-$) radical, for producing polymers and copolymers which may be vulcanized to give rubbery products useful in the fabrication of molded products.

The reactive monomers, also known in the art as reactive diluents, useful in the present invention are β-cyanoethoxyalkyl acrylates having the formula

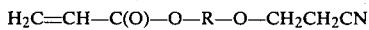

$$H_2C=CH-C(O)-O-R-O-CH_2CH_2CN$$

wherein R is a divalent radical, derived from a glycol, selected from $-CH_2CH_2-$, $-CH_2C(CH_3)_2$, $-CH_2CH_2CH(CH_3)-$, and $-CH_2CH_2-O-CH_2CH_2-$. This group of β-cyanoethoxyalkyl acrylates has been found to provide unexpectedly good results when used as radiation curable reactive monomers. This reactive monomer is used in the composition of the invention in the range of amount of 5–95%, preferably 20–50%, by weight, based on total composition.

The second required component of the radiation curable composition of the invention is a radiation curable acrylated polymer or oil selected from acrylated epoxidized drying-type oils; acrylic oligomers; acrylated bis-phenol A/epoxy resins; acrylated urethane prepolymers (acrylated polyurethanes) produced from the condensate of a polyol, a polyisocyanate, and a hydroxyalkyl acrylate; and unsaturated polyester resins. This component is used in the composition of the invention in the range of amount of 1–90%, preferably 35–55%, by weight, based on total composition.

Other acrylic monomers may be used, in minor amounts, with the required reactive monomer component of the invention as a replacement for a portion thereof. Typical other acrylic monomers include, for example, monacrylates, such as methyl acrylate, cyclopentyl acrylate, 2-ethylhexyl acrylate, hydroxyethyl acrylate and the like; diacrylates such as ethylene glycol diacrylate, triethylene glycol diacrylate, neopentyl glycol diacrylate, 1,4-butanediol diacrylate and the like; triacrylates such as trimethylol propane triacrylate and the like or tetraacrylates such as pentaerythritol tetraacrylate and the like. Also, other monomers containing photosensitive groups, for example, vinylbenzyl benzoylbenzoate and allyl benzoylbenzoate and derivatives thereof, may be used in minor amounts to replace a portion of the required reactive monomer component.

The compositions of this invention are cured or dried by exposure to radiation. The compositions are curable by exposure to ultraviolet light, i.e. to radiation having a wavelength about 2000 to 5000 Å, for a period of time which is sufficient to accomplish the desired amount of cure (or crosslinking) and yet which will not result in any undesirable degradation of the copolymer, said degradation being in the form of oxidation and/or polymer chain cleavage and being manifested by discoloration and a marked deterioration in the physical properties of the copolymer composition. The length of exposure will also be dependent on the source of radiation as well as on the distance between the source and the copolymer sample. In addition, electron beams, gamma radiation emitters and the like can be employed instead of ultraviolet light. Suitable sources of radiation include carbon arcs, mercury-vapor arcs, fluorescent lamps with ultraviolet light emitting phosphors, argon glow lamps, photographic flood lamps, Van der Graaf accelerators, resonant transformers, betatron linear accelerators, gamma radiation emitters and combinations thereof.

Generally, a photoinitiator or sensitizer is added to the composition before exposing the coatings to ultraviolet light. When used, the photoinitiators are used in the amount of about 0.1–15% by weight, preferably about 1–5% by weight, based on total composition. Preferred photoinitiators include selected acyloins or derivatives thereof, for example, benzoin alkyl ethers such as benzoin methyl ether; desyl halides such as desyl bromide or chloride; desyl amine; phenone compounds such as benzophenone and acetophenone and derivatives thereof; polychlorinated aromatic compounds; and a combination of organic carbonyls and amines or mixtures thereof. Suitable acetophenone photoinitiators are disclosed in U.S. Pat. No. 3,715,293 and the combination of organic carbonyls and amines is disclosed in U.S. Pat. No. 3,759,807.

The radiation curable compositions of this invention are useful as coatings and adhesives, especially for flexible substrates. Suitable substrates include textiles and fabrics, paper, and flexible plastic films and articles such as disposable cups and bottles, and also thin metallic sheets or foils. The compositions can be used as laminating adhesives or pressure sensitive adhesives; coatings, pigmented or unpigmented, for paper; coatings or binders for textiles, natural or synthetic, or in vehicles for textile printing inks or for specialized treatments of fabrics to produce water repellency or resistance to chemical stains and other uses which would be apparent to those in the art to which the invention relates.

The compositions of this invention are generally used as films having a thickness of about 0.1–30 mils, and preferably about 0.2–10 mils.

In the following examples which are illustrative of the invention, the parts and percentages are by weight and the temperatures are Centigrade unless otherwise indicated.

EXAMPLE 1

Preparation of 2-(2-Cyanoethoxy)ethyl Acrylate

To a flask equipped with stirrer, reflux condenser, thermometer, and automatic temperature control is charged dry ethylene glycol (2306 g, 37.15 mole) and this is heated to 35°–40° C. To this is added potassium t-butoxide (41.6 g, 0.371 mole) and then, evenly over 3 hr., acrylonitrile (984.5 g, 18.75 mole). The reaction is mildly exothermic but temperatures below 45° C. are easily maintained. After heating for 20 hrs., the catalyst is neutralized by the addition of dilute HCl and the flask is fitted with a 12" Vigreaux column and distilling apparatus, and the resulting mixture is distilled. First, residual acrylonitrile is removed, followed by excess ethylene glycol. Thereafter, 1011 g of cyanoethoxyethanol was obtained by distillation, 122°–124° C./3 mm Hg, the structure of the product being confirmed by infrared and proton nuclear magnetic resonance spectral analysis.

To a flask equipped with stirrer, thermometer, air sparge, sampling septum and an Oldershaw column with automatic distillation apparatus is charged cyanoethoxyethanol (345.3 g, 3 mole), ethyl acrylate (1500 g, 15 mole), dibutyltin oxide (22.3 g, 0.09 mole) and p-methoxyphenol (0.35 g, as inhibitor). This mixture is heated to reflux (pot 99°–103° C.) and the ethanol/ethyl acrylate azeotrope fractionated overhead. After 5½ hrs. at reflux the reaction is complete. The Oldershaw column is replaced with a conventional distillation apparatus and excess ethyl acrylate is removed by distillation at a pot temperature of 70° C. Heating is continued at 1 mm Hg until ethyl acrylate is completely removed. After cooling and filtering, the residue is passed through an alumina column to yield 380 g of clear, almost colorless product. Infrared and proton nuclear magnetic resonance analysis confirmed the structure of the product, 2-(2-cyanoethoxy)ethyl acrylate.

EXAMPLE 2

Cyanoethoxyethoxyethyl Acrylate

Following the procedures described in Example 1, cyanoethoxyethoxyethanol (bp 144°–151° C./2 mm Hg) is prepared from diethylene glycol and acrylonitrile, acrylation of which gives the desired product.

EXAMPLE 3

Cyanoethoxyneopentyl Acrylate

Following the procedures described in Example 1, cyanoethoxyneopentanol (bp 132°–140° C./2 mm Hg) is prepared from neopentyl glycol and acrylonitrile, acrylation of which gives the desired product.

EXAMPLE 4

4-(2-Cyanoethoxy)butyl Acrylate

Following the procedures described in Example 1, 4-(2-cyanoethoxy)-1-butanol (bp 148°–152° C./4.5 mm Hg) is prepared from 1,4-butanediol and acrylonitrile, acrylation of which gives the desired product.

EXAMPLE 5

3-(2-Cyanoethoxy)butyl Acrylate

Following the procedures described in Example 1, 3-(2-cyanoethoxy)-1-butanol (bp 145°–150° C./2.5 mm Hg) is prepared from 1,3-butanediol and acrylonitrile, acrylation of which gives the desired product.

EXAMPLE 6

Solvent Resistant Coating

To demonstrate the resistance to solvent attack by perchloroethylene that the cyanoethoxyalkyl acrylates contribute to radiation curable coatings the following compositions were prepared. Coatings of the compositions were cured as 2 mil films by exposure to 4 lamp passes at 5 m/min. of 80 watt/cm medium pressure mercury radiation. The volume swell ratio of the films in perchloroethylene is a measure of solvent resistance and is reported in Table A below. Isobornyl acrylate was used as a typical reactive monomer for comparison.

TABLE A

| Ingredient | Formulation Number | | | |
|---|---|---|---|---|
| | 1 | 2 | 3 | 4 |
| | Wt % of Each Ingredient | | | |
| Urethane diacrylate resin A | 70 | 50 | 54 | 35 |
| Isobornyl acrylate | 30 | 50 | 23 | 15 |
| β-cyanoethoxyneopentyl acrylate | — | — | 22 | 50 |
| Diethoxyacetophenone | 2 | | | |
| | Perchloroethylene Volume Swell Ratio | | | |
| | 4.1 | 5.4 | 3.7 | 2.2 |

Resin A was prepared by condensing 1 mole of Teracol 3000 (polytetrahydrofuran diol) with 1.5 moles of toluene diisocyanate and 0.55 moles of hydroxyethyl acrylate.

EXAMPLE 7

Relative Rates of Evaporation

An important property for a reactive monomer for use in radiation cure applications is a low vapor pressure or relative rate of evaporation. To demonstrate the low volatility of the cyanoethoxyalkyl acrylates, filter papers were saturated with representative monomers used in the invention and the weight loss of the monomers, compared with that of isobornyl acrylate, itself a relatively non-volatile monomer, was determined as reported below:

| | Relative Rate of Volatilization[1] |
|---|---|
| β-cyanoethoxyneopentyl acrylate | 0.01 |
| β-cyanoethoxyethyl ethyl acrylate | 0.014 |

[1]slope of the weight loss vs. time curve for the monomer divided by that of isobornyl acrylate

EXAMPLE 8

Viscosity Reduction

As viscosity reduction is an important property required for a reactive monomer for use in radiation cure applications, the viscosity of several 1:1 reactive monomer-urethane resin mixtures is determined. Table B below lists the results as determined by a cone and plate viscometer at the shear rate indicated. The results illustrate that the cyanoethoxyalkyl acrylates used in the invention provide advantageous efficiency in reducing the viscosity of resin mixtures compared with other reactive monomers, namely, isobornyl and dicyclopentenyl acrylates. Although the cyanoethoxyalkyl acrylates are less efficient than tetrahydrofurfuryl acrylate, the latter monomer is comparatively extremely volatile.

TABLE B

| | Urethane Diacrylate Resin | |
|---|---|---|
| | Uvithane 782 ® | Castomer U-0100 ® |
| | viscosity in poise at 25° C. | |
| Isobornyl acrylate | —[a] | 13[b] |
| Dicyclopentenyl acrylate | 64 | 16 |
| Cyanoethoxyethyl acrylate | 29 | 7.4 |
| Cyanoethoxyneopentyl acrylate | 38 | 8.6 |
| Tetrahydrofurfuryl acrylate | 16 | 5.4 |

[a] shear rate = 82.4 sec$^{-1}$ for Uvithane 782
[b] shear rate = 300 sec$^{-1}$ for Castomer U-0100
These resins are commercial urethane diacrylate prepolymers. Uvithane 782 is from Thiokol Chem. Div., Castomer U-0100 from Witco Chem.

EXAMPLE 9

Pressure Sensitive Adhesives

This example illustrates the usefulness of a representative cyanoethoxyalkyl acrylate-containing pressure sensitive adhesive composition according to the invention compared with a pressure sensitive adhesive composition containing isobornyl acrylate as the reactive monomer component. The acrylate resin components, "B" and "C", were prepared by conventional free radical solution polymerization of acrylate monomers. A resin having a higher glass transition temperature is required to balance the lower glass transition temperature of the cyanoethoxyneopentyl acrylate with respect to that of isobornyl acrylate. Coatings are cured as in Example 6.

The results of the Pressure Sensitive Tape Council methods tests, set forth in Table C below, demonstrate that the cyanoethoxyalkyl acrylates are especially useful reactive monomers for radiation curable pressure sensitive adhesives in that they provide a desirable balance of high polarity, low glass transition temperature, tackiness, and cohesive strength to the adhesive composition.

TABLE C

| Ingredient | Wt % of Each Ingredient | |
|---|---|---|
| Acrylate resin B | 50 | |
| Acrylate resin C | | 50 |
| Isobornyl acrylate | 45 | |
| Cyanoethoxyneopentyl acrylate | | 45 |
| Witco Castomer U-0100 diacrylate resin | 5 | 5 |
| Diethoxyacetophenone | 2 | 2 |
| Est. glass transition temperature | | |
| Acrylate resin | −80° C. | −34° C. |
| Cured Formulation | −26° C. | −32° C. |
| Pressure Sensitive Tape Properties | PSTC Test # | |
| Type Test | | |
| 180° peel strength (oz/in) | 1 | 24 | 22 |
| Dead load shear strength (hr) | 7 | 0.1 | ~15 |
| Rolling ball tack (in) | 6 | 5.5 | 2.5 |
| Qualitative tack | | very good | exceptional |

EXAMPLE 10

Laminating Adhesive

A laminating adhesive was prepared by mixing 45 g of 3-(2-cyanoethoxy)butyl acrylate, 45 g of Adiprene L-100$^R$ (polyoxytetramethylene-toluene diisocyanate condensation resin, duPont), 1.8% of diethoxyacetophenone, 0.9% of benzophenone, and 0.45% of stannous octoate. Approximately ½ mil of this adhesive composition was applied to a 5 mil film of polyethyleneterephthalate (Mylar$^R$, duPont) and this coated film was subsequently laminated to a second identical Mylar film. This assembly was exposed to 4 lamp passes of 80 watt/cm medium pressure mercury ultraviolet radiation at about 5 m/min. line speed. After 1 day aging the laminate displayed a peel strength of separation of 520 g/cm.

What is claimed is:

1. A radiation curable composition comprising
   (a) about 5-95% by weight, based on total composition, of at least one cyanoethoxyalkyl acrylate having the formula $$H_2C=CH-C(O)-O-R-O-CH_2CH_2CN$$

wherein R is a ($C_2$-$C_5$) alkylene group or a ($C_2$-$C_5$) oxaalkylene group having discrete alkylene segments containing at least two carbon atoms joined by the oxygen atom;
   (b) about 1-90% by weight, based on total composition, of at least one radiation curable component selected from the group of an acrylated polymer or oil and a urethane prepolymer; and
   (c) from 0 up to about 5% by weight, based on total composition, of a photoinitiator.

2. The composition of claim 1 wherein the R group is selected from $-CH_2CH_2-$, $-CH_2C(CH_3)_2CH_2-$, $-CH_2CH_2CH(CH_3)-$, and $-CH_2CH_2-O-CH_2CH_2-$ groups.

3. The composition of claim 1 wherein the acrylated polymer or oil is selected from acrylated epoxidized drying-type oils; acrylic oligomers; acrylated bis-phenol A/epoxy resins; acrylated urethane prepolymers (acrylated polyurethanes) produced from the condensate of a polyol, a polyisocyanate, and a hydroxyalkyl acrylate; urethane prepolymers; and unsaturated polyester resins.

4. The composition of claim 1 comprising
   (a) about 20-50% by weight of the compound $$H_2C=CH-C(O)-O-R-O-CH_2CH_2CN;$$

(b) about 35-55% by weight of the acrylated polymer or oil; and
   (c) about 1-5% by weight of a photoinitiator.

5. A method of coating a substrate which comprises applying to the substrate a composition according to claim 1 and curing or drying the coated substrate by exposing the coated substrate to radiation.

6. The method of claim 5 wherein the coated substrate is cured or dried by exposing it to electron beam radiation.

7. The method of claim 6 wherein the coated substrate is cured or dried by exposing it to ultraviolet light.

8. An article of manufacture comprising a substrate having applied thereto a radiation cured coating comprising the composition of claim 1.

* * * * *

UNITED STATES PATENT AND TRADEMARK OFFICE
CERTIFICATE OF CORRECTION

PATENT NO. : 4,333,963

DATED : June 8, 1982

INVENTOR(S) : William D. Emmons et al

It is certified that error appears in the above-identified patent and that said Letters Patent is hereby corrected as shown below:

Claim 7, line 1 change "claim 6" to -- claim 5 --

Signed and Sealed this

Twenty-third Day of November 1982

[SEAL]

Attest:

GERALD J. MOSSINGHOFF

Attesting Officer

Commissioner of Patents and Trademarks